United States Patent
Saito et al.

(10) Patent No.: US 9,365,760 B2
(45) Date of Patent: Jun. 14, 2016

(54) REFRIGERATING MACHINE OIL AND WORKING FLUID COMPOSITION FOR REFRIGERATING MACHINE

(71) Applicant: JX NIPPON OIL & ENERGY CORPORATION, Tokyo (JP)

(72) Inventors: Masanori Saito, Tokyo (JP); Hiroko Shimpo, Tokyo (JP); Kuniko Adegawa, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/651,080

(22) PCT Filed: Jan. 8, 2014

(86) PCT No.: PCT/JP2014/050152
§ 371 (c)(1),
(2) Date: Jun. 10, 2015

(87) PCT Pub. No.: WO2014/112417
PCT Pub. Date: Jul. 24, 2014

(65) Prior Publication Data
US 2015/0307762 A1 Oct. 29, 2015

(30) Foreign Application Priority Data
Jan. 17, 2013 (JP) .................. 2013-006649

(51) Int. Cl.
*C10M 171/00* (2006.01)
*C09K 5/04* (2006.01)
*C10M 169/04* (2006.01)
*F25B 31/00* (2006.01)

(52) U.S. Cl.
CPC .............. *C09K 5/045* (2013.01); *C10M 169/04* (2013.01); *C10M 171/008* (2013.01); C09K 2205/102 (2013.01); C09K 2205/104 (2013.01); C09K 2205/108 (2013.01); C09K 2205/12 (2013.01); C09K 2205/122 (2013.01); C09K 2205/126 (2013.01); C09K 2205/134 (2013.01); C10M 2203/1045 (2013.01); C10M 2207/283 (2013.01); C10M 2207/289 (2013.01); C10M 2207/2835 (2013.01); C10M 2209/04 (2013.01); C10M 2209/043 (2013.01); C10M 2209/1055 (2013.01); C10M 2219/08 (2013.01); C10M 2219/083 (2013.01); C10M 2219/087 (2013.01); C10M 2223/04 (2013.01); C10M 2223/041 (2013.01); C10N 2220/022 (2013.01); C10N 2220/028 (2013.01); C10N 2220/302 (2013.01); C10N 2220/303 (2013.01); C10N 2220/306 (2013.01); C10N 2230/06 (2013.01); C10N 2230/70 (2013.01); C10N 2240/30 (2013.01); F25B 31/002 (2013.01)

(58) Field of Classification Search
CPC .......... C10M 171/008; C10N 2030/00; C10N 2030/06; C10N 2030/08; C10N 2030/10; C10N 2030/12; C10N 2030/18; C10N 2030/20; C10N 2040/30
USPC .............................. 252/68; 508/439, 493, 502
See application file for complete search history.

(56) References Cited

U.S. PATENT DOCUMENTS

| | | | | |
|---|---|---|---|---|
| 6,526,764 | B1 * | 3/2003 | Singh ..................... | C09K 5/045 252/67 |
| 8,940,742 | B2 * | 1/2015 | Castro .................. | C07D 401/12 514/248 |
| 2001/0038088 | A1 * | 11/2001 | Schnur ................... | C09K 5/045 252/68 |
| 2002/0162989 | A1 * | 11/2002 | Schnur ................. | C08G 75/029 252/68 |
| 2003/0047707 | A1 * | 3/2003 | Schnur ................... | C09K 5/045 252/68 |
| 2003/0062508 | A1 * | 4/2003 | Singh ..................... | C09K 5/045 252/67 |
| 2007/0023730 | A1 * | 2/2007 | Paonessa ............... | C09K 5/045 252/68 |
| 2011/0207638 | A1 * | 8/2011 | Singh .................... | C10M 105/34 508/282 |
| 2012/0322706 | A1 | 12/2012 | Matsumoto | |
| 2012/0322897 | A1 * | 12/2012 | Bredsguard .......... | C10M 169/04 514/785 |
| 2015/0376543 | A1 * | 12/2015 | Saito .................... | C10M 169/04 252/68 |

FOREIGN PATENT DOCUMENTS

| | | |
|---|---|---|
| JP | S58-103595 A | 6/1983 |
| JP | S62-039695 A | 2/1987 |
| JP | H5-171174 A | 7/1993 |
| JP | H8-157847 A | 6/1996 |
| JP | H9-189453 A | 7/1997 |
| JP | 2001-226690 A | 8/2001 |
| JP | 2006-169402 A | 6/2006 |
| JP | 2011-162766 A | 8/2011 |

OTHER PUBLICATIONS

European Search Report issued with respect to application No. 14740698.7, mail date is Jan. 26, 2016.
International Search report issued with respect to application No. PCT/JP2014/050152, mail date is Feb. 4, 2014.
International preliminary report on patentability issued with respect to application No. PCT/JP2014/050152, mail date is Jul. 21, 2015.

* cited by examiner

*Primary Examiner* — Douglas McGinty
(74) *Attorney, Agent, or Firm* — Greenblum & Bernstein, P.L.C.

(57) ABSTRACT

The present invention provides a refrigerating machine oil comprising: a base oil; a sulfide compound; and a gallate, wherein a content of the sulfide compound is 0.01 to 2.0% by mass and a content of the gallate is 10 to 500 ppm by mass based on a total amount of the refrigerating machine oil, and the refrigerating machine oil having a kinematic viscosity at 40° C. of 3 to 500 mm$^2$/s.

9 Claims, No Drawings

REFRIGERATING MACHINE OIL AND WORKING FLUID COMPOSITION FOR REFRIGERATING MACHINE

TECHNICAL FIELD

The present invention relates to a refrigerating machine oil used for a refrigerating machine and a working fluid composition for a refrigerating machine. The "refrigerating machine" as used herein includes air conditioners for automobiles, dehumidifiers, refrigerators, freezing-refrigerating warehouses, vending machines, showcases, cooling apparatus for chemical plants or the like, air conditioners for housing, package air conditioners and heat pumps for supplying hot water.

BACKGROUND ART

Currently, as a refrigerant for refrigerators, car air conditioners, room air conditioners, industrial refrigerating machines or the like are widely used 1,1,1,2-tetrafluoroethane (R134a), which is one of hydrofluorocarbons (HFC), an R410A which is a mixed refrigerant of difluoromethane (R32) and pentafluoroethane (R125) in a mass ratio of 1/1 and the like. However, the use of these HFC refrigerants is regulated by the so-called F-gas Regulation because they have a high global warming potential (GWP) of 1000 or more although their ozone-depleting potential (ODP) is zero.

As a substitute candidate for a refrigerant with a high GWP, single 2,3,3,3-tetrafluoropropene (HFO-1234yf) or difluoromethane (R32) is studied because of the thermodynamic properties. In addition, these refrigerants and a mixed refrigerant of them with other refrigerants which have balanced properties with GWP are also studied. It is essential for the substitute for a HFC refrigerant to have a low GWP and HFO-1234yf has a low GWP of 4. R32 has a slightly high GWP of 675, however it is studied as a potential candidate because it has a high gas pressure and is a highly efficient refrigerant.

Further, hydrocarbon refrigerants such as isobutane (R600a) and propane (R290), which are practically used for refrigerators, have a low GWP of 20 or less and proper physical properties, and therefore are studied although their combustibility, and carbon dioxide (R744), which has a GWP of 1 (standard), is studied as a single refrigerant or a refrigerant to be mixed for the purpose of fireproofing.

When these refrigerants are used, the working fluid in which a refrigerant and a refrigerating machine oil are mixed together is required to have a higher antiwear property than that of the conventional one because of severe lubrication conditions.

In general, as an antiwear additive to improve the lubricity of a lubricating oil are known oiliness agents such as alcohols, esters and long-chain fatty acids, antiwear agents such as phosphates, metal dithiophosphates, and extreme-pressure agents such as organic sulfur compounds and organic halogen compounds. In the case of a refrigerating machine oil, alcohol-based or ester-based oiliness agents or triphenyl phosphate or tricresyl phosphate among phosphates are used because they do not precipitate even when coexisting with a refrigerant and only an additive which does not adversely affect stability can be used.

Furthermore, Patent Literature 1 suggests a lubricating oil including one for refrigerating machine in which a phosphorus-based additive and a specific epoxy compound are added in combination, Patent Literature 2 suggests a lubricating oil for a compressor in which a triphenyl phosphate and a tri(alkylphenyl) phosphate are added in combination for a HFC refrigerant, and Patent Literature 3 suggests a refrigerating machine oil in which a tricresyl phosphate and an epoxy consisting of a glycidyl ether or a carbodiimide are added for a HFC refrigerant.

However, oiliness agents among these additives form a lubricating film by adsorption, and therefore the friction coefficient can be maintained low in the case of relatively mild loading conditions such as a mixed lubricating area, however the effect of antiwear is lost in the case of severe loading conditions. On the other hand, triphenyl phosphate and tricresyl phosphate have an insufficient antiwear property under severe lubrication conditions in which a refrigerant with a low GWP coexists although they have a certain degree of an antiwear property effect.

Because of these facts, a refrigerating machine oil with a higher antiwear property is demanded and a working fluid with a high antiwear property in which a refrigerant is mixed is required in a freezing/air conditioning system.

CITATION LIST

Patent Literature

[Patent Literature 1] Japanese Patent Application Laid-Open No. 5-171174
[Patent Literature 2] Japanese Patent Application Laid-Open No. 8-157847
[Patent Literature 3] Japanese Patent Application Laid-Open No. 9-189453

SUMMARY OF INVENTION

Technical Problem

The present invention was made in view of the above problems, and it is the object of the present invention to provide a refrigerating machine oil and working fluid composition for a refrigerating machine having a high effect of antiwear and being excellent in long-term reliability even under severe lubrication conditions in which a refrigerant coexists.

Solution to Problem

The present inventors found that a refrigerating machine oil in which a sulfide compound and a gallate are blended in a base oil and a working fluid for a refrigerating machine consisting of a refrigerant can significantly improve the antiwear property of a refrigerating machine oil without any adverse effect on other properties, and the present invention was completed.

That is, the present invention provides a refrigerating machine oil and working fluid composition for a refrigerating machine according to the following [1] to [9].

[1] A refrigerating machine oil comprising: a base oil; a sulfide compound; and a gallate, wherein a content of the sulfide compound is 0.01 to 2.0% by mass and a content of the gallate is 10 to 500 ppm by mass based on a total amount of the refrigerating machine oil, and the refrigerating machine oil having a kinematic viscosity at 40° C. of 3 to 500 mm$^2$/s.

[2] The refrigerating machine oil according to [1], wherein the base oil is at least one selected from an ester with a carbon/oxygen molar ratio of 2.5 or more and 5.8 or less and an ether with a carbon/oxygen molar ratio of 2.5 or more and 5.8 or less; and the kinematic viscosity of the refrigerating machine oil at 40° C. is 3 to 300 mm²/s.

[3] The refrigerating machine oil according to [1] or [2], wherein the base oil is at least one selected from a polyol ester obtainable by synthesis of a fatty acid with 4 or more and 9 or less carbon atoms and a polyalcohol with 4 or more and 12 or less carbon atoms, a polyalkylene glycol, a compound in which hydroxyl groups at both ends of a polyalkylene glycol are etherified, and a polyvinyl ether.

[4] The refrigerating machine oil according to any one of [1] to [3], further comprising 0.05 to 3% by mass of an orthophosphate based on the total amount of the refrigerating machine oil.

[5] The refrigerating machine oil according to any one of [1] to [4], wherein the sulfide compound is a thiobisphenol compound and the gallate has an alkyl group with 1 to 18 carbon atoms.

[6] The refrigerating machine oil according to any one of [1] to [5], further comprising 2 to 20% by mass of pentaerythritol tetra(2-ethylhexanoate) based on the total amount of the refrigerating machine oil.

[7] A working fluid composition consisting of a refrigerant with a global warming potential of 700 or less; and the refrigerating machine oil according to any one of [1] to [6].

[8] The working fluid composition according to [7], wherein the refrigerant is a refrigerant comprising at least one selected from a hydrofluorocarbon, a hydrofluoroolefin, carbon dioxide and a hydrocarbon with 2 to 4 carbon atoms.

[9] The working fluid composition according to [8], wherein the refrigerant is a refrigerant comprising at least one selected from difluoromethane and 2,3,3,3-tetrafluoropropene.

Advantageous Effects of Invention

The refrigerating machine oil and working fluid composition according to the present invention exert a special effect that they have a significant effect of antiwear even under severe lubrication conditions in which a refrigerant coexists and can be used stably for a long time.

DESCRIPTION OF EMBODIMENTS

The refrigerating machine oil according to the present embodiment contains a base oil and 0.01 to 2.0% by mass of a sulfide compound and 10 to 500 ppm by mass of a gallate based on a total amount of the refrigerating machine oil, and has a kinematic viscosity at 40° C. of 3 to 500 mm²/s.

In the present embodiment, at least one selected from a mineral oil-based base oil and a synthesized oil-based base oil can be used as the base oil. These base oils may be used in a mixture of two or more thereof.

Examples of the mineral oil-based base oil include paraffin-based mineral oils, naphthene-based mineral oils and mixed-base mineral oils, and any of them is a refined lubricating oil fraction obtained by treating the lubricating oil fraction obtained by subjecting a crude oil to atmospheric distillation and further reduced-pressure distillation with means for refining a lubricating oil such as solvent deasphalting, solvent extraction, hydrorefining, hydrocracking, solvent dewaxing, hydrodewaxing and clay treatment in combination appropriately, and can be suitably used. Among them, the solvent extraction, hydrorefining and hydrocracking are processes to control the composition, and the solvent dewaxing and hydrodewaxing to remove the wax component are processes to control low-temperature properties such as a pour point, and the clay treatment is a process to remove the nitrogen component mainly to improve the stability of a base oil. Refined lubricating oil fractions with different characteristics obtained by combining various raw materials with various refining means may be used singly or in combination of two or more.

Examples of the synthesized oil-based base oil include oxygen-containing compounds such as esters and ethers, hydrocarbon oils such as poly-α-olefins (PAO), ethylene-α-olefin oligomers, alkylbenzenes and alkylnaphthalenes.

Among the oxygen-containing compounds used as a base oil, esters are compounds having various molecular structures, and are a base oil characterized in they have unique viscosity properties and low-temperature properties respectively and have a higher flash point than that of hydrocarbon-based base oil with the same viscosity. Esters can be obtained by subjecting an alcohol and a fatty acid to dehydration condensation reaction, and in the present embodiment, examples of the suitable base oil component include diesters of a dibasic acid and a monohydric alcohol, polyol esters of a polyol (particularly, a neopentyl polyol) and a monocarboxylic acid, and complex esters of a polyol, a polybasic acid and a monohydric alcohol (or a monocarboxylic acid) from the viewpoint of chemical stability.

In the case that an ester is used as the oxygen-containing compound, it is preferable that the ester have the carbon/oxygen molar ratio of 2.5 or more and 5.8 or less from the view point of compatibility with low-GWP refrigerants (such as R32) which have a high polarity. In addition, more preferred are polyol esters which are synthesized from a linear or branched fatty acid with 4 to 9 carbon atoms and a polyhydric alcohol with 4 to 12 carbon atoms and which are excellent in compatibility with various low-GWP refrigerants.

Specific examples of the linear fatty acid with 4 to 9 carbon atoms include butanoic acid, pentanoic acid, hexanoic acid, heptanoic acid, octanoic acid and nonanoic acid. Specific examples of the branched fatty acid include branched butanoic acids, branched pentanoic acids, branched hexanoic acids, branched heptanoic acids, branched octanoic acids and branched nonanoic acids. More specifically, fatty acids having a branch at the α- and/or β-position are preferable, and 2-methylpropanoic acid, isobutanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid and the like are preferable, and among them, 2-methylpropanoic acid, 2-ethylhexanoic acid and/or 3,5,5-trimethylhexanoic acid are the most preferable. Note that fatty acids other than the fatty acids with 4 to 9 carbon atoms may be contained.

Polyhydric alcohols with 2 to 6 hydroxy groups are preferable as the polyhydric alcohol. Further, it is preferable that the number of carbon atoms of the polyhydric alcohol be 4 to 12. Specifically hindered alcohols such as neopentyl glycol, trimethylolethane, trimethylolpropane, trimethylolbutane, di-(trimethylolpropane), pentaerythritol and di-(pentaerythritol) are preferable. Pentaerythritol or a mixture ester of pentaerythritol and di-(pentaerythritol) is the most preferable because they are excellent in compatibility with refrigerants and hydrolytic stability.

Among the oxygen-containing compounds used as a base oil, examples of the ether include polyalkylene glycols, compounds in which one end or both ends of a polyalkylene glycol is/are etherified and polyvinyl ethers. Examples of the polyalkylene glycol include polypropylene glycols, polyethylene glycols and copolymers of propylene oxide and ethylene oxide. Compounds in which the hydroxy group at one end is etherified and the hydroxy group at the other end is remained is typical, however, compounds in which the both ends are etherified is preferable because they have a low hygroscopicity, and with regard to the backbone, an oxypropylene type is more preferred than an oxyethylene type which has a high hygroscopicity. In the case of etherifying the end, an alkyl group with 1 to 4 carbon atoms is preferable from the view point of compatibility with refrigerants and the smaller the number of carbon atoms is, the better the compatibility becomes. In view of compatibility, stability, electrical insulation properties, low hygroscopicity or the like, polypropylene glycols in which the both ends are methyl-etherified are the most preferable.

A preferred polyvinyl ether used as a base oil has a structural unit represented by the following formula (1). This polyvinyl ether may be a homopolymer whose structural units are identical or a copolymer which is composed of two or more types of structural units, however a copolymer is preferable because it enables to adjust the properties in a balanced manner.

[Chemical Formula 1]

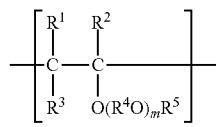

(1)

[$R^1$, $R^2$ and $R^3$ may be identical to or different from each other and each represents a hydrogen atom or a hydrocarbon group; $R^4$ represents a divalent hydrocarbon group or a divalent hydrocarbon group containing an oxygen constituting an ether bond; $R^5$ represents a hydrocarbon group; m represents an integer of 0 or more and preferably an integer so that the average value of m can be 0 to 10; $R^1$ to $R^5$ may be identical to or different from each other in each structural unit; and when m is 2 or more in one structural unit, a plurality of $R^4O$ may be identical to or different from each other.]

Also with regard to these ethers, more preferable are ethers with a carbon/oxygen molar ratio of 2.5 or more and 5.8 or less, which is excellent in compatibility with low-GWP refrigerants, particularly refrigerants containing R32.

A PAO is widely used among hydrocarbon oils used as a synthesized base oil, and the properties are determined depending on the degree of polymerization because it is a polymer of an α-olefin. Alkylbenzenes are used in the field of lubricating oils for a refrigerating machine, and they are classified into a linear type and a branched type on the basis of the structure of the alkyl group and used in a different way depending on the object because they have different properties from each other.

Usually, these mineral oil-based and synthesized oil-based base oils can be blended in an appropriate fraction so that various performances required depending on the application can be satisfied. In this case, a plurality of mineral oil-based and synthesized oil-based base oils may be used respectively.

Any of monosulfide compounds, disulfide compounds and polysulfide compounds can be used as the sulfide compound in the present embodiment, however, monosulfide compounds are preferable. Monosulfide compounds, for example, have a less activity than disulfide compounds and are preferable from the view point of the stability of a refrigerating machine oil, the suppression of the degeneration of copper widely used in a refrigerating machine, or the like.

Examples of the sulfide compound include diphenyl sulfide, dibenzyl sulfide, didecyl sulfide, didodecyl sulfide and thiobisphenol compounds, and thiobisphenol compounds, which are commonly known as antioxidants, have radical capturing ability and are also stabilizers, are preferable for the application of the present invention. As the thiobisphenol compound, a compound represented by the following formula (2) is preferably used.

[Chemical Formula 2]

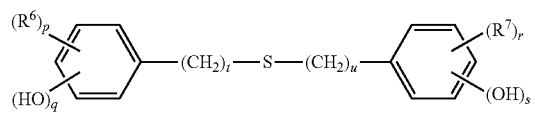

(2)

[$R^6$ and $R^7$ may be identical to or different from each other and each represents a hydrocarbon group; p, q, r and s may be identical to or different from each other and each represents an integer of 0 to 5 such that p+q and r+s are 0 to 5, with the proviso that at least one of q and s is 1 or more; and t and u may be identical to or different from each other and each represents an integer of 0 to 10.]

In the formula (2), $R^6$ and $R^7$ may be identical to or different from each other and each represents a hydrocarbon group, and p, q, r and s may be identical to or different from each other and each represents an integer of 0 to 5 such that p+q and r+s are 0 to 5. However, at least one of q and s is 1 or more and most preferably both of q and s are 1. Further, t and u may be identical to or different from each other and each represents an integer of 0 to 10. t and u are preferably 0 to 4, more preferably both of t and u are 0 or 1, and most preferably both of t and u are 0. A preferred hydrocarbon group is an alkyl group, cycloalkyl group and alkenyl group with 1 to 10 carbon atoms, preferably with 1 to 6 carbon atoms and phenyl group, and specific examples thereof include a methyl group, an ethyl group, an n-propyl group, an i-propyl group, an n-butyl group, a sec-butyl group and a tert-butyl group.

Preferred examples of the compound represented by the formula (2) specifically include 4,4'-thiobis(3-methyl-6-tert-butylphenol), 4,4'-thiobis(2,6-di-tert-butylphenol), 4,4'-thiobis(2-methyl-6-tert-butylphenol), 2,2'-thiobis(4-methyl-6-tert-butylphenol), 2,2'-thiobis(4,6-di-tert-butylphenol) and bis(3,5-di-tert-butyl-4-hydroxybenzyl)sulfide.

The content of the sulfide compound is 0.01 to 2% by mass, preferably 0.05 to 1% by mass, and more preferably 0.1 to 0.5% by mass based on the total amount of the refrigerating machine oil. The above range is preferable because the antiwear property-improving effect is high and the corrosive wear due to an atmosphere may not be caused.

With regard to the gallate in the present embodiment, gallic acid is an aromatic carboxylic acid in which three hydroxy groups are bonded to an aromatic ring, and also known as 3,4,5-trihydroxybenzoic acid. And an ester obtained by the reaction of gallic acid and an alcohol is a gallate (gallic acid ester). Examples of the gallate include methyl gallate, ethyl gallate, propyl gallate, isoamyl gallate, octyl gallate and dodecyl gallate, and some of them are used as a food additive. Compounds whose alkyl group has 1 to 18 carbon atoms are preferable as the gallate in the present embodiment, and when the alkyl group has more than 18 carbon atoms, the effect of antiwear is lowered. Esters of gallic acid and an alcohol with 1 to 8 carbon atoms are more preferable and ethyl gallate and propyl gallate are the most preferable.

The content of the gallate is 10 to 500 ppm by mass, preferably 10 to 100 ppm by mass based on the total amount of the refrigerating machine oil. By setting the content to the above range, a high stability and a sufficient antiwear property-improving effect can be obtained without precipitation at a low temperature due to the reduction of solubility in a base oil.

In the present embodiment, the refrigerating machine oil can further contain an orthophosphate as an antiwear additive.

Preferred compounds as the orthophosphate include triphenyl phosphate (TPP), tricresyl phosphate (TCP) and alkylphenyl phosphates (APP) having an alkyl group with 3 to 4 carbon atoms. TPP and TCP have a single structure and an APP is a mixture of one having one alkylphenyl (mono-type), one having two alkylphenyls (di-type) and one having three alkylphenyls (tri-type), however, the ratio thereof is not particularly limited.

The content of the orthophosphate is preferably 0.05 to 3% by mass, more preferably 0.1 to 2% by mass, and further preferably 0.2 to 1.5% by mass based on the total amount of the refrigerating machine oil. By setting the content to the above range, a sufficient antiwear property-improving effect and a high stability can be obtained.

In the present embodiment, the antiwear property of the working fluid is significantly improved by further blending pentaerythritol tetra(2-ethylhexanoate) in the refrigerating machine oil. Pentaerythritol tetra(2-ethylhexanoate) is an ester synthesized from pentaerythritol and 2-ethylhexanoic acid. It is desirable that it be a complete ester (also referred to as a "full ester") in which all of the hydroxyl groups in the pentaerythritol are esterified. It is preferable that the acid value of the ester be 0.1 mgKOH/g or less and the hydroxyl value thereof be 10 mgKOH/g or less, respectively. The amount of the above ester to be blended is 2 to 20% by mass based on the total amount of the refrigerating machine oil, and preferably 2 to 7% by mass, although the optimum amount to be blended varies depending on the type and viscosity of the base oil. A significant antiwear property-improving effect cannot be exerted in the cases of a large amount and a small amount to be blended, although the mechanism has not been revealed.

In the present embodiment, in order to further improve the performance, an additive conventionally used for a lubricating oil such as an antioxidant, a friction modifier, an antiwear agent, an extreme-pressure agent, a rust inhibitor, a metal deactivator and an antifoaming agent can be contained in the refrigerating machine oil within a range not impairing the object of the present invention.

Examples of the antioxidant include phenol compounds such as di-tert-butyl-p-cresol, and amine compounds such as an alkyldiphenylamine; examples of the friction modifier include aliphatic amines, aliphatic amides, aliphatic imides, alcohols and esters; examples of the antiwear agent include acidic phosphate amine salts, phosphite amine salts and zinc dialkyldithiophosphates; examples of the extreme-pressure agent include olefin sulfides and sulfurized oils and fats; examples of the rust inhibitor include alkenyl succinates or alkenyl succinic acid partial esters; examples of the metal deactivator include benzotriazole and thiadiazole; and examples of the antifoaming agent include silicone compounds and polyester compounds, respectively.

The kinematic viscosity of the refrigerating machine oil at 40° C. is 3 to 500 mm$^2$/s, preferably 3 to 300 mm$^2$/s, and more preferably 5 to 150 mm$^2$/s. By setting the kinematic viscosity in the above range, a sufficient antiwear property can be obtained and compatibility with a refrigerant can be enhanced.

The characteristics of the refrigerating machine oil other than the kinematic viscosity at 40° C. are not particularly limited, however, the viscosity index is preferably 10 or more. The pour point is preferably −10° C. or lower, and more preferably −20° C. or lower. The flash point is preferably 120° C. or higher, and more preferably 200° C. or higher.

In addition, the acid value of the refrigerating machine oil is not particularly limited, however, in order to prevent the corrosion of metals used in a refrigerating machine or a piping and suppress the deterioration of the refrigerating machine oil itself, the acid value can be preferably set to 0.1 mgKOH/g or less, and more preferably 0.05 mgKOH/g or less. Note that the acid value in the present invention means an acid value measured in accordance with JIS K2501 "Petroleum products and lubricants-Determination of neutralization number".

The moisture content of the refrigerating machine oil is not particularly limited, however, it is preferably 200 ppm or less, more preferably 100 ppm or less, and most preferably 50 ppm or less. Particularly in the case that the refrigerating machine oil is used for a sealed-type refrigerating machine, the moisture content is required to be low from the viewpoint of the stability and electrical insulation properties of the refrigerating machine oil.

With regard to refrigerating machines, there is a trend that the current HFC refrigerant with a high global warming potential (GWP) is replaced with a refrigerant with a low GWP from the viewpoint of preventing the global warming as described above, and a refrigerating machine oil applied thereto is required.

Currently, 1,1,1,2-tetrafluoroethane (R134a) is widely used for refrigerators and car air conditioners, and R410A which is a mixed refrigerant of difluoromethane (R32) and pentafluoroethane (R125) in a mass ratio of 1/1 is widely used for room air conditioners. For the base oil of the refrigerating machine oil for these refrigerants, esters, polyethers, particularly polyol esters, polyalkylene glycols and polyvinyl ethers, which have a moderate mutual solubility (compatibility), are suitable.

In a refrigerant circulation cycle in a refrigerating/air conditioning machine, the refrigerating machine oil lubricating the compressor circulates in the cycle along with the refrigerant, and therefore the compatibility of the refrigerating machine oil with the refrigerant is required. If the refrigerating machine oil and the refrigerant are not compatible, the refrigerating machine oil discharged from the compressor is likely to remain in the cycle, and as a result the amount of the oil in the compressor is decreased to cause problems such as wear due to defective lubrication and the blockage of an expansion mechanism such as a capillary.

However, any of the above refrigerants has a high GWP of 1000 or more and therefore the use thereof is going to be regulated by the so-called F-gas Regulation. As an alternative therefor, hydrofluoroolefins (ISO) which are unsaturated hydrocarbons with a low GWP and difluoromethane (R32), or hydrocarbon refrigerants such as isobutane (R600a) and propane (R290), carbon dioxide (R744), and in addition mixed refrigerants containing them are studied and considered to be leading candidates.

Examples of the unsaturated hydrocarbon include 2,3,3,3-tetrafluoropropene (HFO-1234yf), 1,3,3,3-tetrafluoropropene (HFO-1234ze) and 1,2,3,3,3-pentafluoropropene (HFO-1225ye). These HFO refrigerants have an olefin structure subject to decomposition in the molecule, and therefore characterized in that they have a low stability, although having a low GWP. In particular, under conditions of a high loading, a local heat generation occurs at a sliding part of metal/metal contact to cause the decomposition of the refrigerant to be accelerated along with wear and hydrofluoric acid is generated, which may lead to the deterioration of the working fluid in which the refrigerant and the refrigerating machine oil are mutually dissolved and moreover may cause corrosive wear in relation to lubricity, and therefore the lubricity of the refrigerating machine oil is critical properties.

In the case of R32 which is a hydrofluorocarbon (HFC) having a low boiling point and a high pressure or a mixed refrigerant containing a large amount of R32, the discharge temperature of the compressor is increased to reduce the thickness of the oil film of the refrigerating machine oil, resulting in severe lubrication conditions. In the case of a hydrocarbon refrigerant, it has no fluorine in the hydrocarbon molecule, which contributes to the improvement of lubricity, and has a high solubility in the refrigerating machine oil, which lowers the viscosity of the refrigerating machine oil, resulting in severe lubrication conditions. As described above, any of the refrigerant candidates having a low GWP causes severe conditions in view of lubricity, and therefore the refrigerating machine oil to be used is required to have a high lubricity.

The refrigerant in the present embodiment is not particularly limited, however, a refrigerant which dissolves mutually, that is, a refrigerant which dissolves mutually without being separated into two layers at a normal temperature is preferable. Further, from the aspect of the environmental protection, a refrigerant having a global warming potential (GWP) of 700 or less is preferable, a refrigerant containing one or more selected from a hydrofluorocarbon (HFC), a hydrofluoroolefin (HFO), carbon dioxide (R744) and a hydrocarbon with 2 to 4 carbon atoms is more preferable, and a refrigerant containing difluoromethane (R32) and/or 2,3,3,3-tetrafluoropropene (HFO-1234yf) is the most preferable.

In the working fluid composition for a refrigerating machine according to the present embodiment, the blending ratio of the refrigerating machine oil/refrigerant is not particularly limited, however, the blending ratio is usually 1 to 1000 parts by weight, and preferably 2 to 800 parts by weight based on 100 parts by weight of the refrigerant.

EXAMPLES

Hereinafter, the present invention will be specifically described on the basis of Examples and Comparative Examples, however, the present invention is never limited to the following Examples.

Examples 1 to 12, Comparative Examples 1 to 10

In Examples 1 to 12 and Comparative Examples 1 to 10, refrigerating machine oils having the compositions shown in Tables 1 to 3 were prepared using the base oils and additives shown in the following. Note that the content ratio of the base oil and the additive shown in Tables 1 to 3 is a content ratio based on the total amount of the refrigerating machine oil.

[Base Oil]
(A-1) Polyol ester (POE-1): an ester of pentaerythritol and a mixed acid of 2-methylpropanoic acid and 3,5,5-trimethylhexanoic acid in a mass ratio of 35:65 (kinematic viscosity: 68.1 mm$^2$/s @40° C.; viscosity index: 84; pour point: −40° C.; flash point: 240° C.)

(A-2) Polyol ester (POE-2): an ester of pentaerythritol and a mixed acid of 2-ethylhexanoic acid and 3,5,5-trimethylhexanoic acid in a mass ratio of 50:50 (kinematic viscosity: 66.7 mm$^2$/s @40° C.; viscosity index: 92; pour point: −40° C.; flash point: 248° C.)

(A-3) Polyalkylene glycol (PAG): a polyoxypropylene in which the both ends are each blocked with a methyl group (average molecular weight: 1000; kinematic viscosity: 46.0 mm$^2$/s @40° C.; viscosity index: 190; pour point: −45° C.; flash point: 218° C.)

(A-4) Polyvinyl ether (PVE): a copolymer of ethyl vinyl ether and isobutyl vinyl ether (ethyl vinyl ether:isobutyl vinyl ether is 7:1 in a weight ratio), (average molecular weight: 910; kinematic viscosity: 66.4 mm$^2$/s @40° C.; viscosity index: 85; pour point: −35° C.; flash point: 210° C.)

(A-5) Mineral oil (MO): paraffin-based refined mineral oil (kinematic viscosity: 22.3 mm$^2$/s @40° C.; viscosity index: 95; pour point: −15° C.; flash point: 200° C.)

Note that the kinematic viscosity and the viscosity index were measured in accordance with JIS K2283, the pour point was measured in accordance with JIS K2269, and the flashing point was measured in accordance with JIS K2265.

[Sulfide Compound]
(S-1) Dibenzyl sulfide
(S-2) Didodecyl sulfide
(S-3) 4,4'-thiobis(3-methyl-6-tert-butylphenol)
[Gallate]
(G-1) Propyl gallate (n-propyl gallate)
(G-2) Octyl gallate (n-octyl gallate)
[Orthophosphate]
(P-1) Tricresyl phosphate (TCP)
[Other Base Blending Material]
(D-1) Pentaerythritol tetra(2-ethylhexanoate) (an ester of pentaerythritol and 2-ethylhexanoic acid; acid value: 0.01 mgKOH/g; hydroxyl value: 1.2 mgKOH/g)

Next, the refrigerating machine oils in Examples 1 to 12 and Comparative Examples 1 to 10 were subjected to the following lubricity test and stability test in combination with the various refrigerants shown in Tables 1 to 3. Note that "1234yf" in Tables 1 to 3 means HFO-1234yf.

(Lubricity Test)
The lubricity test was in accordance with ASTM D3233-73 and the wear test was carried out with a Falex (pin/V-block) test machine at a constant loading.

In the Falex wear test, a running-in was performed for 5 min at an initial temperature of 50° C., a rotational frequency of 290 rpm and a loading of 50 Lbf under an atmosphere with the blowing of the refrigerant controlled (70 ml/min), and thereafter the final test was performed for 1 h at the same rotational frequency and a loading of 100 Lbf to measure the total value (mg) of the amounts of wear for the pin and the V-block after the test.

R32, HFO-1234yf and R600a (isobutane) were used as the refrigerant to be blown.

(Stability Test)
The stability test was in accordance with HS K2211-09 (autoclave test), in which 90 g of a sample oil whose moisture content was adjusted to 100 ppm was weighed in a autoclave, and catalysts (wires made of iron, copper, and aluminum, respectively, outer diameter 1.6 mm×length 50 mm for any of them) and 10 g of each refrigerant (R32, HFO-1234yf, R600a) were sealed in, and thereafter heated to 175° C. and the appearance and acid value (JIS C2101) of the sample oil after 100 h were measured.

The acid values of sample oils before the stability test (new oil) were all 0.01 mgKOH/g.

TABLE 1

|  | Example 1 | Example 2 | Example 3 | Example 4 | Example 5 | Example 6 | Example 7 | Example 8 |
|---|---|---|---|---|---|---|---|---|
| <Base oil> | | | | | | | | |
| Type | A-1 | A-1 | A-1 | A-2 | A-2 | A-2 | A-3 | A-4 |
| Content ratio (% by mass) | 99.8 | 99.8 | 98.8 | 96.8 | 99.8 | 99.5 | 99.0 | 98.8 |
| <Additive or base blending material> (% by mass) | | | | | | | | |
| S-1 | 0.2 | — | — | — | 0.2 | — | — | — |
| S-2 | — | — | — | — | — | — | 1.0 | — |
| S-3 | — | 0.2 | 0.2 | 0.2 | — | 0.5 | — | 0.2 |
| P-1 | — | — | 1.0 | — | — | — | — | 1.0 |
| D-1 | — | — | — | 3.0 | — | — | — | — |
| <Additive> (ppm by mass) | | | | | | | | |
| G-1 | 50 | 50 | — | 50 | 50 | 50 | — | 50 |
| G-2 | — | — | 50 | — | — | — | 50 | — |
| Kinematic viscosity at 40° C. of refrigerating machine oil (mm$^2$/s) | 68.2 | 68.2 | 68.3 | 65.9 | 66.8 | 66.9 | 46.2 | 65.5 |
| <Lubricity test> | | | | | | | | |
| Refrigerant | R32 | R32 | R32 | R32 | 1234yf | R600a | R32 | R32 |
| Amount of wear (mg) | 3.2 | 3.0 | 1.6 | 1.8 | 3.6 | 2.8 | 2.2 | 1.6 |
| <Thermal stability test> | | | | | | | | |
| Refrigerant | R32 | R32 | R32 | R32 | 1234yf | R600a | R32 | R32 |
| Appearance | No precipitation | No precipitation | No precipitation | No precipitation | No precipitation | No precipitation | No precipitation | No precipitation |
| Acid value (mgKOH/g) | 0.01 | 0.01 | 0.01 | 0.01 | 0.03 | 0.01 | 0.01 | 0.01 |

TABLE 2

|  | Example 9 | Example 10 | Example 11 | Example 12 | Comparative Example 1 | Comparative Example 2 | Comparative Example 3 | Comparative Example 4 |
|---|---|---|---|---|---|---|---|---|
| <Base oil> | | | | | | | | |
| Type | A-5 | A-3 | A-4 | A-5 | A-1 | A-3 | A-1 | A-1 |
| Content ratio (% by mass) | 99.8 | 99.8 | 99.8 | 99.8 | 100 | 100 | 99.8 | 99.5 |
| <Additive or base blending material> (% by mass) | | | | | | | | |
| S-1 | 0.2 | — | — | — | — | — | 0.2 | — |
| S-2 | — | — | — | — | — | — | — | — |
| S-3 | — | 0.2 | 0.2 | 0.2 | — | — | — | 0.5 |
| P-1 | — | — | — | 1.0 | — | — | — | — |
| D-1 | — | — | — | — | — | — | — | — |
| <Additive> (ppm by mass) | | | | | | | | |
| G-1 | 20 | 30 | 100 | — | — | — | — | — |
| G-2 | — | — | — | 20 | — | — | — | — |
| Kinematic viscosity at 40° C. of refrigerating machine oil (mm$^2$/s) | 22.4 | 46.1 | 66.5 | 22.3 | 68.1 | 46.0 | 68.1 | 68.2 |
| <Lubricity test> | | | | | | | | |
| Refrigerant | R600a | 1234yf | 1234yf | R600a | R32 | 1234yf | R32 | R32 |
| Amount of wear (mg) | 3.1 | 3.9 | 3.3 | 2.0 | 12.3 | 14.5 | 8.2 | 7.6 |
| <Thermal stability test> | | | | | | | | |
| Refrigerant | R600a | 1234yf | 1234yf | R600a | R32 | 1234yf | R32 | R32 |
| Appearance | No precipitation | No precipitation | No precipitation | No precipitation | No precipitation | No precipitation | No precipitation | No precipitation |
| Acid value (mgKOH/g) | 0.01 | 0.03 | 0.03 | 0.01 | 0.01 | 0.03 | 0.01 | 0.01 |

TABLE 3

|  | Comparative Example 5 | Comparative Example 6 | Comparative Example 7 | Comparative Example 8 | Comparative Example 9 | Comparative Example 10 |
|---|---|---|---|---|---|---|
| <Base oil> | | | | | | |
| Type | A-2 | A-3 | A-4 | A-5 | A-1 | A-1 |
| Content ratio (% by mass) | 100 | 99.0 | 98.0 | 98.8 | 98.9 | 98.8 |
| <Additive or base blending material> (% by mass) | | | | | | |
| S-1 | — | 0.2 | — | — | — | — |
| S-2 | — | — | — | — | 1.0 | — |
| S-3 | — | — | — | 0.2 | — | 0.2 |
| P-1 | — | — | 1.0 | 1.0 | — | 1.0 |
| D-1 | — | — | — | — | — | — |
| <Additive> (ppm by mass) | | | | | | |
| G-1 | 50 | 1000 | — | — | — | — |
| G-2 | — | — | — | — | — | — |
| Kinematic viscosity at 40° C. of refrigerating machine oil (mm$^2$/s) | 66.7 | 46.2 | 45.9 | 22.3 | 68.2 | 68.0 |
| <Lubricity test> | | | | | | |
| Refrigerant | R32 | 1234yf | R32 | R600a | R32 | R32 |
| Amount of wear (mg) | 8.6 | 4.6 | 7.0 | 6.8 | 6.9 | 6.5 |
| <Thermal stability test> | | | | | | |
| Refrigerant | R32 | 1234yf | R32 | R600a | R32 | R32 |
| Appearance | No precipitation | Precipitation | No precipitation | No precipitation | No precipitation | No precipitation |
| Acid value (mgKOH/g) | 0.01 | 0.12 | 0.01 | 0.01 | 0.01 | 0.01 |

As seen from Tables 1 to 3, even though the slight increase of the acid value was found in the combinations with HFO-1234yf, Examples 1 to 12 were non-problematic with regard to the stability, and when referring to Comparative Examples, the increase of the acid value was found in Comparative Example 6, in which a large amount of propyl gallate (G-1) was blended.

With regard to lubricity, the amount of wear is small in all of Examples 1 to 12, indicating a good antiwear property. In particular, it can be seen that the amount of wear is small in Examples 3 and 8 in which an orthophosphate (P-1) is further blended and Example 4 in which the base blending material (D-1) is blended.

On the other hand, it can be seen that the amount of wear is considerably large in Comparative Examples 1 and 2, and even though the amount of wear in Comparative Examples 3 to 10 is less than that in Comparative Example 1 or 2, Comparative Examples 3 to 10 are further inferior to Examples in the effect of antiwear even when the amount of the additive to be blended is larger than that in Examples. For example, comparing Examples 1 and 2 with Comparative Examples 3 and 4, it can be seen that antiwear property is significantly improved by blending a sulfide compound and a small amount of a gallate. Adding only a gallate in Comparative Example 5 does not provide much antiwear property effect. In Comparative Example 6, although the antiwear property is slightly improved, the stability is lowered, and the corrosive wear may be involved.

INDUSTRIAL APPLICABILITY

The working fluid composition for refrigerating/air conditioning according to the present invention is a working fluid excellent in long-term reliability which can maintain the effect of antiwear even under severe lubrication conditions, and therefore can be suitably used for a refrigerating/air conditioning system with a high cooling efficiency which has a compressor, a condenser, a throttle device, an evaporator or the like and circulates a refrigerant through them, in particular a system having a compressor such as a rotary type, swing type and scroll type compressor, and can be used in the field of room air conditioners, package air conditioners, refrigerators, car air conditioners, industrial refrigerating machines or the like.

The invention claimed is:

1. A refrigerating machine oil comprising:
    a base oil;
    a sulfide compound; and
    a gallate,
    wherein a content of the sulfide compound is 0.01 to 2.0% by mass and a content of the gallate is 10 to 500 ppm by mass based on a total amount of the refrigerating machine oil, and
    the refrigerating machine oil having a kinematic viscosity at 40° C. of 3 to 500 mm$^2$/s.

2. The refrigerating machine oil according to claim 1, wherein the base oil is at least one selected from an ester with a carbon/oxygen molar ratio of 2.5 or more and 5.8 or less and an ether with a carbon/oxygen molar ratio of 2.5 or more and 5.8 or less; and the kinematic viscosity of the refrigerating machine oil at 40° C. is 3 to 300 mm$^2$/s.

3. The refrigerating machine oil according to claim 1, wherein the base oil is at least one selected from a polyol ester obtainable by synthesis of a fatty acid with 4 or more and 9 or less carbon atoms and a polyalcohol with 4 or more and 12 or less carbon atoms, a polyalkylene glycol, a compound in which hydroxyl groups at both ends of a polyalkylene glycol are etherified, and a polyvinyl ether.

4. The refrigerating machine oil according to claim 1, further comprising 0.05 to 3% by mass of an orthophosphate based on the total amount of the refrigerating machine oil.

5. The refrigerating machine oil according to claim 1, wherein the sulfide compound is a thiobisphenol compound and the gallate has an alkyl group with 1 to 18 carbon atoms.

6. The refrigerating machine oil according to claim 1, further comprising 2 to 20% by mass of pentaerythritol tetra (2-ethylhexanoate) based on the total amount of the refrigerating machine oil.

7. A working fluid composition for a refrigerating machine consisting of:
   a refrigerant with a global warming potential of 700 or less; and
   the refrigerating machine oil according to claim 1.

8. The working fluid composition for a refrigerating machine according to claim 7, wherein the refrigerant is a refrigerant comprising at least one selected from a hydrofluorocarbon, a hydrofluoroolefin, carbon dioxide and a hydrocarbon with 2 to 4 carbon atoms.

9. The working fluid composition for a refrigerating machine according to claim 7, wherein the refrigerant is a refrigerant comprising at least one selected from difluoromethane and 2,3,3,3-tetrafluoropropene.

* * * * *